US007804547B2

(12) United States Patent
Teranishi

(10) Patent No.: US 7,804,547 B2
(45) Date of Patent: Sep. 28, 2010

(54) LIQUID CRYSTAL DISPLAY DEVICE

(75) Inventor: Kentaro Teranishi, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 1126 days.

(21) Appl. No.: 11/424,148

(22) Filed: Jun. 14, 2006

(65) Prior Publication Data

US 2006/0284825 A1 Dec. 21, 2006

(30) Foreign Application Priority Data

Jun. 15, 2005 (JP) ............................ 2005-175233

(51) Int. Cl.
H04N 5/74 (2006.01)

(52) U.S. Cl. ...................................................... 348/751

(58) Field of Classification Search ................. 348/751, 348/790, 791, 792, 725, 726, 760, 761, 766, 348/744; 345/102, 98
See application file for complete search history.

(56) References Cited

U.S. PATENT DOCUMENTS

| | | | | |
|---|---|---|---|---|
| 6,069,620 | A * | 5/2000 | Nakamura et al. | 345/214 |
| 6,085,307 | A * | 7/2000 | Evoy et al. | 712/31 |
| 6,429,840 | B1 * | 8/2002 | Sekiguchi | 345/88 |
| 6,590,553 | B1 * | 7/2003 | Kimura et al. | 345/92 |
| 6,671,009 | B1 * | 12/2003 | Hattori et al. | 349/33 |
| 6,693,619 | B1 * | 2/2004 | Miura et al. | 345/102 |
| 7,193,598 | B2 * | 3/2007 | Huang | 345/98 |
| 7,525,613 | B2 * | 4/2009 | Teranishi | 349/100 |
| 7,623,111 | B2 * | 11/2009 | Ioki et al. | 345/102 |
| 2006/0055661 | A1 * | 3/2006 | Kawaguchi | 345/102 |

FOREIGN PATENT DOCUMENTS

| | | |
|---|---|---|
| EP | 1 113 412 A2 | 7/2001 |
| JP | 62-141589 | 6/1987 |
| JP | 3-63622 | 3/1991 |
| JP | 2002-202491 | 7/2002 |
| JP | 2002-303849 | 10/2002 |
| KR | 2001-0081976 | 8/2001 |

* cited by examiner

*Primary Examiner*—Paulos M Natnael
(74) *Attorney, Agent, or Firm*—Oblon, Spivak, McClelland, Maier & Neustadt, L.L.P.

(57) ABSTRACT

A liquid crystal display device includes a liquid crystal display panel, a backlight which illuminates the liquid crystal display panel, and a display control circuit which controls the liquid crystal display panel and the illumination light source. The display control circuit includes a panel driving section which drives the liquid crystal display panel after supply of power, a state detecting section which detects a display driving state that the panel driving section drives the liquid crystal display panel for display of a stable image corresponding to a video signal, and a light source driving section which drives the backlight in accordance with an illumination request signal, after detection of the display driving state by the state detecting section.

4 Claims, 3 Drawing Sheets

LIQUID CRYSTAL DISPLAY DEVICE

CROSS-REFERENCE TO RELATED APPLICATIONS

This application is based upon and claims the benefit of priority from prior Japanese Patent Application No. 2005-175233, filed Jun. 15, 2005, the entire contents of which are incorporated herein by reference.

BACKGROUND OF THE INVENTION

1. Field of the Invention

The present invention relates to a liquid crystal display device applied to a liquid crystal display panel of, for example, optically compensated bend (OCB) mode.

2. Description of the Related Art

A flat-panel display device represented by a liquid crystal display device is widely utilized as display device for a computer, a car navigation system, a television receiver, etc.

In general, the liquid crystal display device comprises a liquid crystal display panel that includes a matrix array of liquid crystal pixels, and a display control circuit that controls the display panel. The liquid crystal display panel has a structure in which a liquid crystal layer is held between an array substrate and an counter substrate.

The array substrate includes a plurality of pixel electrodes arrayed substantially in a matrix, a plurality of gate lines arranged along the rows of pixel electrodes, a plurality of source lines arranged along the columns of pixel electrodes, and a plurality of switching elements arranged near intersections between the gate lines and the source lines. Each switching element is made, for example, of a thin film transistor (TFT), and is turned on to apply the potential of a corresponding source line to a corresponding pixel electrode when a corresponding gate line has been driven. On the counter substrate, a common electrode is provided to face the pixel electrodes arrayed on the array substrate. Each pair of the pixel electrodes and common electrode serves as a pixel together with a pixel region of the liquid crystal layer, and controls the alignment of liquid crystal molecules in the pixel region by an electric field between the pixel electrode and the common electrode. The display control circuit includes a gate driver for driving the gate lines, a source driver for driving the source lines, and a controller for controlling operation timings of the gate driver and source driver.

In the case where the liquid crystal display device is used for a television receiver that principally displays a moving image, a liquid crystal display panel of an OCB mode, in which liquid crystal molecules exhibit a good response characteristic, has begun to be employed (refer to Jpn. Pat. Appln. KOKAI Publication No. 2002-202491). In this liquid crystal display panel, liquid crystal molecules are set to a splay alignment before supply of power by alignment layers which have been rubbed parallel to each other on the pixel electrode and the common electrode. The liquid crystal display panel begins a display operation after the liquid crystal molecules have been transferred from the splay alignment to a bend alignment by a relatively strong electric field applied in an initialization process which is performed upon supply of power.

A reason why the liquid crystal molecules get in the splay alignment before supply of power is that the splay alignment is more stable than the bend alignment in terms of energy in a no-voltage-applied state of a liquid crystal drive voltage. Even after the liquid crystal molecules have been transferred to the bend alignment, the bend alignment of the molecules tends to be inverse-transferred to the splay alignment if a no-voltage-applied state or a voltage-applied state of a voltage not higher than a level at which the energy of splay alignment is balanced with the energy of bend alignment, continues for a long time. The viewing angle characteristic of the splay alignment significantly differs from that of the bend alignment. Thus, a normal display is not attained in the splay alignment.

In a conventional driving method that prevents the inverse-transfer from the bend alignment to the splay alignment, a high voltage is applied to liquid crystal molecules in a part of one frame period for display of single-frame image, for example. This high voltage is equivalent to a pixel voltage for a black display in a liquid crystal display panel, which is a normally-white type, so this driving method is called “black insertion driving”.

Meanwhile, in a case where a backlight is used as an illumination light source in a display operation of the liquid crystal display panel, an illumination request is supplied from a video signal source, which is a user circuit for the liquid crystal display panel. If the backlight is driven immediately after supply of power, an unstable image appears on the liquid crystal display panel because of the liquid crystal molecules incompletely transferred from the splay alignment to the bend alignment. The transfer time required for reliable transfer from the splay alignment to the bend alignment depends on an ambient temperature around the liquid display panel. As a technique of keeping the unstable image out of view, the backlight may be controlled to illuminate the display panel at a timing sufficiently delayed after supply of power. However, this technique raises the problem that the backlight would not turn on quickly, even if transfer from the splay alignment to the bend alignment has been completed in a short period of time and the liquid crystal display panel has become a state capable of displaying a stable image corresponding to the video signal.

BRIEF SUMMARY OF THE INVENTION

An object of the present invention is to provide a liquid crystal display device which can shorten a wait time required for start of illumination by an illumination light source after a request of illumination, without displaying an unstable image.

According to an aspect of the present invention, there is provided a liquid crystal display device which comprises a liquid crystal display panel; an illumination light source which illuminates the liquid crystal display panel; and a display control circuit which controls the liquid crystal display panel and the illumination light source; wherein the display control circuit includes a panel driving section which drives the liquid crystal display panel after supply of power, a state detecting section which detects a display driving state that the panel driving section drives the liquid crystal display panel for display of a stable image corresponding to a video signal, and a light source driving section which drives the illumination light source in accordance with a request of illumination, after detection of the display driving state by the state detecting section.

With the liquid crystal display device, the illumination light source is driven in accordance with a request of illumination, after detection of a state that the panel driving section drives the liquid crystal display panel for display of a stable image corresponding to a video signal. For example, when transfer of the liquid crystal molecules from the splay alignment to the bend alignment is required upon supply of power, the panel driving section would not be in the state of driving the liquid crystal display panel for display of the stable image until the transfer has been completed. Even if the request of illumination is externally supplied during the transfer, no unstable image appears on the liquid crystal display panel since the light source driving section would not drive the illumination light source. After completion of the transfer, the panel driving section will be in the state of driving the liquid crystal display panel for display of the stable image. As this state is detected by the state detecting section, the light source driving section drives the illumination light source in accordance with a request of illumination. Thus, a start timing of illumination would not be unnecessarily delayed, as compared with a control in which a margin for absorbing a variation in the transfer time depending on an ambient temperature is taken into consideration. Accordingly, it is possible to shorten a wait time required for start of illumination by the illumination light source after a request of illumination, without displaying the unstable image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display device according to one embodiment of the present invention will be described in more details with reference to the accompanying drawings.

Figure 1:
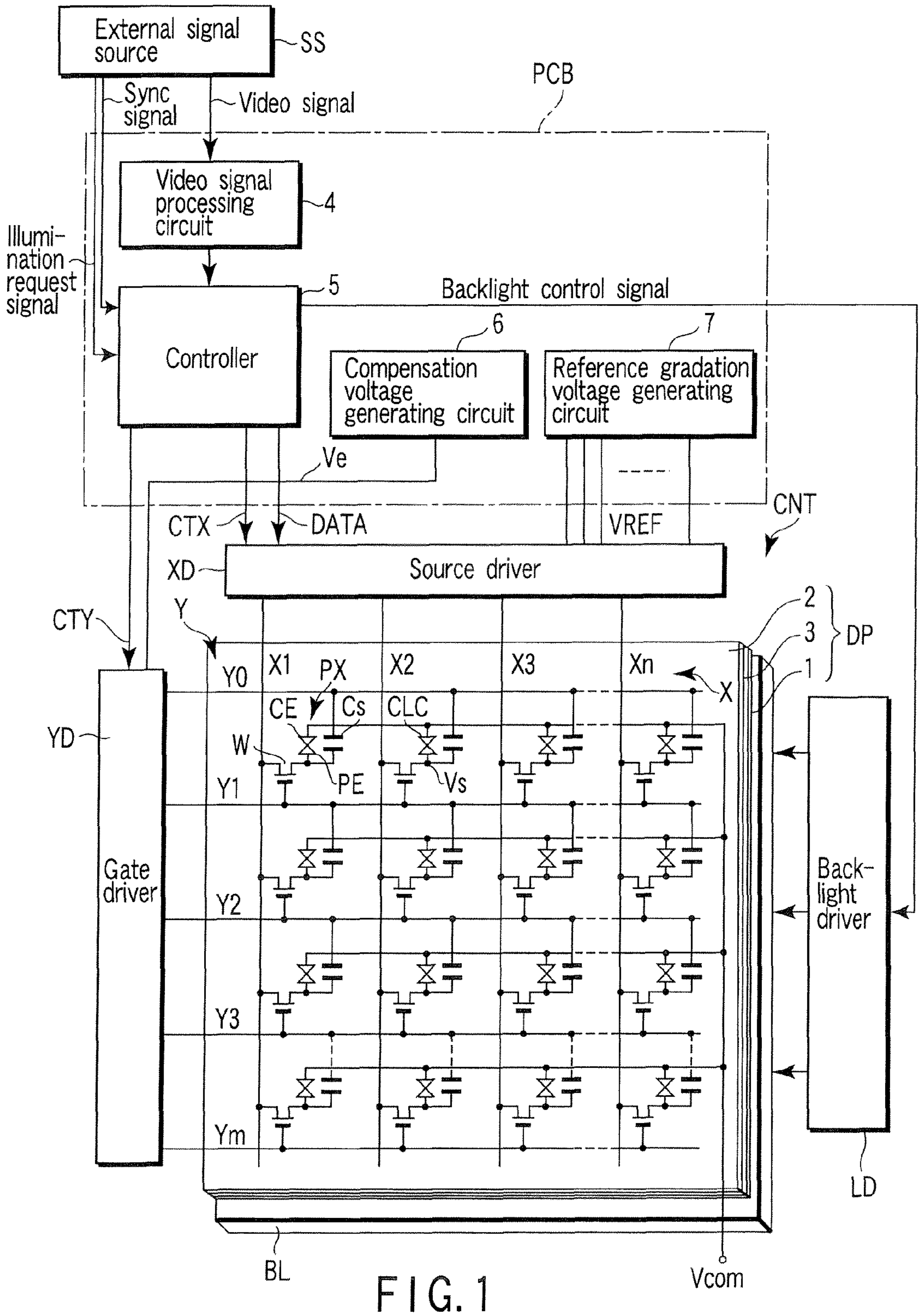
FIG. 1 is a diagram schematically showing the circuit configuration of a liquid crystal display device according to one embodiment of the present invention.

FIG. 1 schematically shows the circuit configuration of the liquid crystal display device according to the embodiment. The liquid crystal display device comprises an OCB-mode liquid crystal display panel DP, a backlight BL provided as an illumination light source for illuminating the display panel DP, and a display control circuit CNT which controls the display panel DP and the backlight BL. The liquid crystal display panel DP has a structure in which a liquid crystal layer 3 is held between an array substrate 1 and a counter substrate 2 which serve as a pair of electrode substrates. The backlight BL is disposed on the rear side (array substrate 1 side) of the liquid crystal display panel DP. The liquid crystal layer 3 includes an OCB liquid crystal material whose liquid crystal molecules are transferred in advance from a splay alignment to a bend alignment to attain a normally-white display operation and are prevented from being inverse-transferred from the bend alignment to the splay alignment by a black display voltage periodically applied thereto. The display control circuit CNT applies a liquid crystal drive voltage from the array substrate 1 and counter substrate 2 to the liquid crystal layer 3 to control transmittance of the liquid crystal display panel DP. The splay alignment can be transferred to the bend alignment by applying a relatively large electric field to the liquid crystal molecules in a predetermined initialization process which is performed by the display control circuit CNT upon supply of power.

The array substrate 1 includes a plurality of pixel electrodes PE arrayed substantially in a matrix on a transparent insulating substrate such as a glass plate, a plurality of gate lines Y (Y0 to Ym) arranged along the rows of pixel electrodes PE, a plurality of source lines X (X1 to Xn) arranged along the columns of pixel electrodes PE, and a plurality of pixel switching elements W arranged near intersections between the gate lines Y and the source lines X. Each of the pixel switching elements turns on between a corresponding source line X and a corresponding pixel electrode PE when a corresponding gate line is driven. Further, each pixel switching element W is made, for example, of a thin-film transistor, a gate of the thin-film transistor is connected to the gate line Y, and a source-drain path is connected between the source line X and the pixel electrode PE.

The counter substrate 2 includes a color filter arranged on a transparent insulating substrate such as a glass plate, and a common electrode CE formed on the color filter and facing the pixel electrodes PE. The pixel electrodes PE and the common electrode CE are made of a transparent electrode material such as ITO, and are covered with alignment layers rubbed parallel to each other. Each pair of the pixel electrode PE and the common electrode CE serves as a pixel PX together with a pixel region of the liquid crystal layer 3, in which the alignment of liquid crystal molecules is controlled by an electric field between the pixel electrode PE and the common electrode CE.

The pixels PX have liquid crystal capacitances CLC provided between the pixel electrodes PX and the common electrode CE and connected to one ends of storage capacitances Cs. Each of the storage capacitances Cs is obtained by capacitive coupling between the pixel electrode PE of one pixel PX and a gate line Y which is located next to this pixel PX on one side and controls the pixel switching elements W for the pixels PX of a previous row, and has a sufficiently large capacitance with respect to the parasitic capacitance of the pixel switching element W. In addition, although there are dummy pixels located outside the matrix array of the pixels PX which serve as a display area, these dummy pixels are omitted in FIG. 1. The dummy pixels are wired in the same manner as that for the pixels PX in the display area in order to establish equivalent conditions with respect to the parasitic capacitance or the like. A gate line YQ is provided for such dummy pixels.

The display control circuit CNT includes a video signal processing circuit 4, a gate driver YD, a source driver XD, a backlight driver LD, and a controller 5. The video signal processing circuit receives a video signal including pixel data items DATA for the pixels PX and input from an external signal source SS every one-frame period (vertical scan period) and processes the video signal to convert resolution, gradation and the like. The gate driver YD sequentially drives the gate lines Y0 to Ym to turn on the switching elements W in units of one row. The source driver XD converts the pixel data items DATA which are supplied in series for the pixels PX of each row as a conversion result of the video signal processing circuit 4 to pixel voltages Vs and outputs the pixel voltages Vs to the source lines X1 to Xn while the switching elements W of each row are kept conductive by driving a corresponding gate line Y. The backlight driver LD drives the backlight BL. The controller 5 controls operation timings or the like of the gate driver YD and the source driver XD to be suitable for the pixel data items DATA for the pixels PX of each row, and controls the backlight driver LD such that the backlight BL is driven in accordance with an illumination request signal from an external signal source SS. Each pixel voltage Vs is a voltage applied to a corresponding pixel electrode PE with a common voltage Vcom of the common electrode CE used as a reference. The polarity of the pixel voltage Vs is inverted with respect to the common voltage Vcom so as to carry out frame inversion driving and line inversion driving, for example.

Each of the gate driver YD and the source driver XD is provided as integrated circuit (IC) chips mounted on flexible wiring sheets arranged along an outer edge of the array substrate 1, for example. On the other hand, the video signal processing circuit 4 and the controller 5 are provided on an external printed circuit board PCB. The controller 5 produces a gate driver control signal CTY for a control of sequentially driving the gate liens Y, and a source driver control signal CTX for a control of assigning the pixel data items DATA for the pixels PX of each row to the source lines X and specifying an output polarity, for example. The control signal CTY is supplied from the controller 5 to the gate driver YD, and the control signal CTX is supplied from the controller 5 to the source driver XD together with the pixel data items DATA for the pixels PX of each row which are obtained as the conversion result from the video signal processing circuit 4.

The display control circuit CNT further includes a compensation voltage generating circuit 6 and a gradation reference voltage generating circuit 7. The compensation voltage generating circuit 6 generates a compensation voltage Ve to be used to compensate for fluctuation of the pixel voltages Vs caused by the pixel switching elements W for the pixels PX of one row. The gradation reference voltage generating circuit 7 generates a predetermined number of gradation reference voltages VREF to be used to convert the pixel data items DATA into the pixel voltage Vs. When the pixel switching elements W for the pixels PX of the row are made nonconductive, the compensation voltage Ve is applied via the gate driver YD to a previous gate line Y which is located on one side next to the gate line Y connected to the pixel switching elements W.

The gate driver YD is controlled by the control signal CTY to sequentially select the gate lines Y1 to Ym in one frame period and supply to a selected one of the gate lines Y1 to Ym an on-voltage by which the pixel switching elements W for the pixels PX of one row are made conductive for one horizontal period. The video signal processing circuit 4 outputs a conversion result of pixel data items DATA for the pixels PX of one row every one horizontal period. The source driver XD converts the pixel data items DATA to pixel voltages Vs, respectively, by referring to the predetermined number of gradation reference voltages VREF supplied from the gradation reference voltage generating circuit 7 described above, and outputs the pixel voltages Vs to the source lines X1 to Xn in parallel.

For example, when the gate line Y1 is driven by the on-voltage from the gate driver YD to turn on all the pixel switching elements W connected to the gate line Y1, the pixel voltages Vs on the source lines X1 to Xn are supplied to the corresponding pixel electrodes PE and the ends of the storage capacitances Cs via the pixel switching elements W, respectively. The compensation voltage Ve from the compensation voltage generating circuit 6 is output to the previous gate line Y0 next to the gate line Y1 by the gate driver YD. Immediately after all the pixel switching elements W connected to the gate line Y1 are kept conductive for one horizontal period, the gate driver YD outputs an off-voltage to the gate line Y1 to make the pixel switching elements W nonconductive. When these pixel switching elements W have been made nonconductive, the compensation voltage Ve serves to reduce the amount of charge pulled out from the pixel electrodes PE by the parasitic capacitances of the pixel switching elements W and cancel substantial fluctuation of the pixel voltage Vs, i.e., a field-through voltage $\Delta Vp$.

The illumination request signal is supplied from the external signal source SS to the controller 5 so as to illuminate the liquid crystal display panel DP by the backlight BL. The controller 5 produces a backlight control signal based on presence or absence of the backlight control signal. The backlight driver LD turns on or off in accordance with the backlight control signal.

Figure 2:
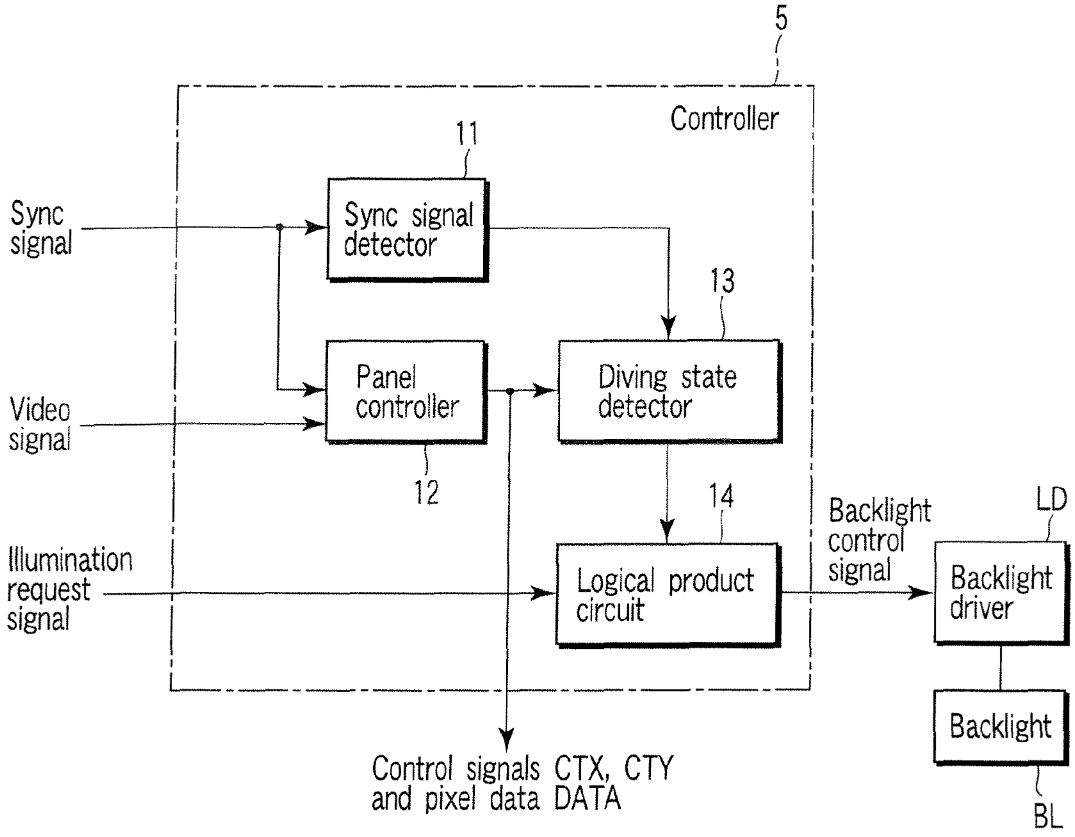
FIG. 2 is a block diagram showing an example of the configuration of a controller shown in FIG. 1.

FIG. 2 shows an example of the configuration of a controller 5. The controller 5 includes a sync signal detector 11, a panel controller 12, a driving state detector 13, and a logical product circuit 14. The sync signal detector 11 is provided to detect a sync signal from the external signal source SS. The panel controller 12 is provided to produce the gate driver control signal CTY, source driver control signal CTX, and the pixel data items DATA on the basis of the video signal and the sync signal. The panel controller 12 is associated with the gate driver YD and source driver XD to serve as a panel driving section that drives the liquid crystal display panel DP. More specifically, the panel controller 12 outputs the gate driver control signal CTY, source driver control signal CTX, pixel data items DATA, and common voltage Vcom which are produced at timings synchronous to the sync signal after supply of power, for transfer driving that attains the liquid crystal molecules transferred from the splay alignment to the bend alignment. Subsequently, the panel controller 12 outputs the gate driver control signal CTY, source driver control signal CTX, pixel data items DATA, and common voltage Vcom which are produced for display driving that attains a stable image corresponding to the video signal.

The driving state detector 13 is provided to detect the driving state of the panel controller 12 based on the sync signal detected by the sync signal detector 11 and output signals from the panel controller 12. More specifically, when proper signals synchronous to the sync signal are output from the panel controller 12, the driving state detector 13 confirms that the panel controller 12 have become stable. Then, the driving state detector 13 checks whether the output signals are for transfer driving or display driving to detect the driving state of the panel controller 12. The driving state detector 13 outputs an output signal at low level in the transfer driving state and an output signal at high level in the display driving state. The sync signal detector 11 and driving state detector 13 are associated with each other to serve as a state detecting section for detecting a driving state that the panel driving section drives the liquid crystal display panel DP for display of a stable image corresponding to the video signal.

The logical product circuit 14 generates a backlight control signal for turning on the backlight BL when both the illumination request signal and the output signal of the driving state detector 13 are at high level, and a backlight control signal for turning off the backlight BL when at least one of the illumination request signal and the output signal of the driving state detector 13 is at low level. The backlight driver LD selectively drives the backlight BL in accordance with the backlight control signal. The logical product circuit 14 and the backlight driver LD are associated with each other to serve as a light source driving section which drives the backlight BL in accordance with the illumination request signal, after the state detecting section has detected the display driving state that the panel driving section drives the liquid crystal display panel DP for display of the stable image.

Figure 3:
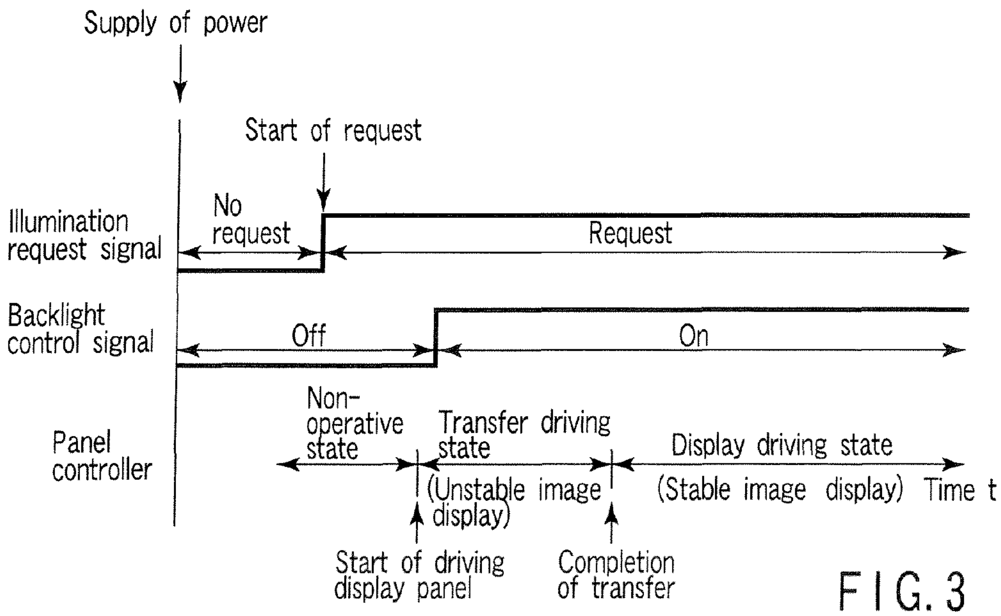
FIG. 3 is a diagram showing a time chart showing an operation of a controller serving as a comparative example.

Herein, a controller of a conventional type will be explained as a comparative example. As shown in FIG. 3, if the controller 5 outputs a backlight control signal for turning on the backlight BL in response to an illumination request signal supplied from the external signal source SS, in a state unable to drive the gate driver YD and source driver XD at normal timings synchronous to the sync signal or in a driving state of transferring the liquid crystal molecules from the splay alignment to the bend alignment, an unstable image will appear on the liquid crystal display panel DP upon illumination by the backlight BL.

Further, the driving state of the controller 5 depends on a period between supply of power and supply of the illumination request signal. The external signal source SS is unable to grasp that the driving state of the controller 5 has become stable since the controller 5 is located downstream of the external signal source SS. If the backlight BL is controlled to turn on at a timing sufficiently delayed after supply of power, as a technique of keeping the unstable image out of view, this causes an increase in the wait time required for start of illumination by the backlight BL after a request of illumination.

Accordingly, the controller 5 of the present embodiment is configured as shown in FIG. 2.

Figure 4:
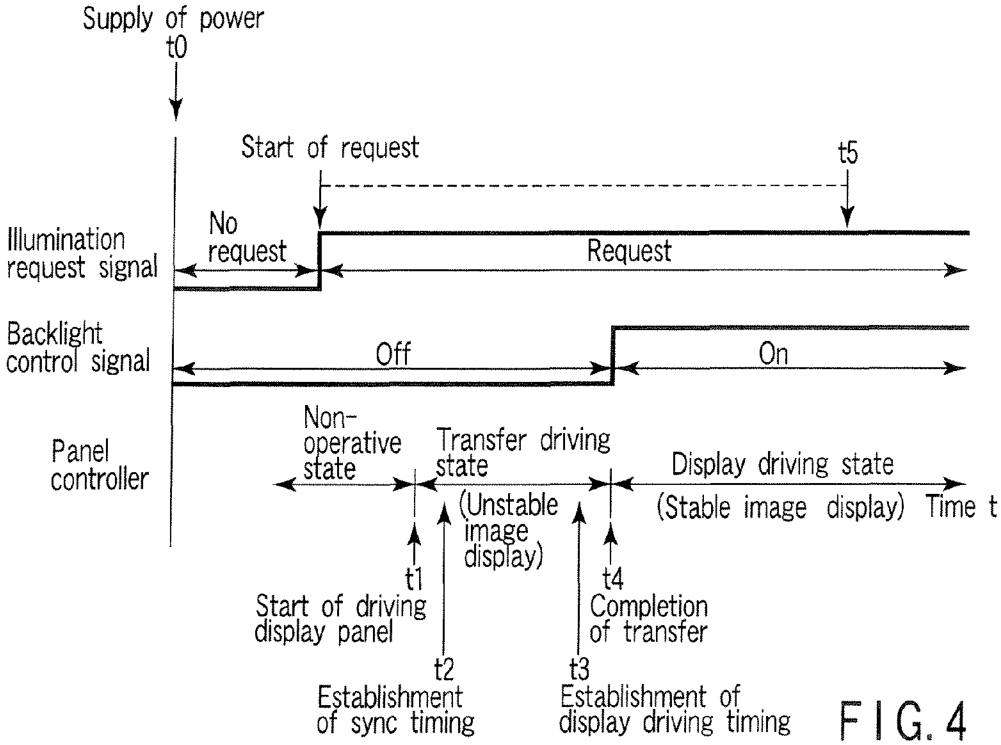
FIG. 4 is a time chart showing an operation of the controller shown in FIG. 2.

With the controller 5, power is supplied at time t= t0, as shown in FIG. 4. Thereafter, a display panel driving operation of the display control circuit CNT including the controller 5 starts at time t= t1. Subsequently, the operation of the display control circuit CNT becomes stable, and the sync signal is detected by the sync signal detector 11 at time T= T2 to establish a sync timing. The panel controller 12 outputs the gate driver control signal CTY, source driver control signal CTX, pixel data items DATA, and common voltage Vcom which are produced for transfer driving at timings synchronous to the sync timing, thereby causing the panel driving section to be in the transfer driving state. A period for transfer driving is controlled using an output signal, for example, from a temperature sensor or the like that detects an ambient temperature around the liquid crystal display panel DP.

The panel controller 12 establishes a display driving start timing at time t= t3 while transfer driving is performed, and outputs at time t= t4 the gate driver control signal CTY, source driver control signal CTX, pixel data items DATA, and common voltage Vcom which are produced for display driving that attains a stable image corresponding to the video signal, thereby causing the panel driving section to be in the display driving state. At time t= t4, the display driving state is detected by the driving state detector 13, and the logical product circuit 14 raises the backlight control signal to turn on the backlight BL.

In a case where the illumination request signal is supplied at time t= t5 subsequent to time t= t4, the logical product circuit 14 raises the backlight control signal at time t= t5. The backlight driver LD drives the backlight BL when the backlight control signal is raised as described above.

According to the present embodiment, the illumination light source (backlight BL) is driven in accordance with an illumination request signal, after detection of a state that the panel driving section (panel controller 12, gate driver YD, and source driver XD) drives the liquid crystal display panel DP for display of a stable image corresponding to a video signal.

For example, when transfer of the liquid crystal molecules from the splay alignment to the bend alignment is required upon supply of power, the panel driving section would not be in the state of driving the liquid crystal display panel DP for display of the stable image until the transfer has been completed. Even if the illumination request signal is supplied from the external signal source SS during the transfer, no unstable image appears on the liquid crystal display panel DP since the light source driving section (logical product circuit 14 and backlight driver LD) would not drive the backlight BL. After completion of the transfer, the panel driving section drives will be in the state of driving the liquid crystal display panel for display of the stable image. As this state is detected by the state detecting section (sync signal detector 11 and driving state detector 13), the light source driving section drives the backlight BL in accordance with the illumination request signal. Thus, a start timing of illumination would not be unnecessarily delayed, as compared with a control in which a margin for absorbing a variation in the transfer time depending on an ambient temperature is taken into consideration. Accordingly, it is possible to shorten a wait time required for start of illumination by the backlight BL after a request of illumination, without displaying the unstable image.

In the embodiment described above, the liquid crystal display device employs a liquid crystal display panel DP of an OCB mode that requires transfer of liquid crystal molecules from the splay alignment to the bend alignment. The liquid crystal display panel DP of a mode other than the OCB-mode may be employed. In the same manner as that described above, the light source driving section drives the back light BL in accordance with a request of illumination, after detection of the display driving state that the panel driving section drives the liquid crystal display panel DP for display of a stable image corresponding to a video signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:

a liquid crystal display panel;

an illumination light source which illuminates said liquid crystal display panel; and a display control circuit which controls said liquid crystal display panel and said illumination light source;

wherein said display control circuit includes a panel driving section which drives said liquid crystal display panel after supply of power, a state detecting section which detects a display driving state that said panel driving section drives said liquid crystal display panel for display of a stable image corresponding to a video signal, and a light source driving section which drives said illumination light source in accordance with a request of illumination, after detection of the display driving state by said state detecting section, wherein said panel driving section is configured to be in a transfer driving state of transferring liquid crystal molecules from a splay alignment to a bend alignment upon supply of power in a case where said liquid crystal display panel is of an OCB mode, and in the display driving state subsequently to the transfer driving state.

2. The liquid crystal display device according to claim 1, wherein said state detecting section is configured to detect a sync signal supplied together with the video signal and detects a driving state of said panel driving section based on the sync signal and output signals from said panel driving section.

3. The liquid crystal display device according to claim 2, wherein said light source driving section is configured to turn on and off said illumination light source based on a logical product of a signal serving as the request of illumination and a detection signal from said state detecting section.

4. The liquid crystal display device according to claim 1, wherein said illumination light source is a backlight disposed on a rear side of said liquid crystal display panel.

* * * * *